United States Patent Office 3,452,043
Patented June 24, 1969

3,452,043
PRODUCTION OF 1-N,N-DIMETHYLCARBAMOYL-5 - METHYL - 3 - N,N-DIMETHYL-CARBAMOYL-OXY-PYRAZOLE
Theodor Grauer, Arlesheim and Heinrich Urwyler, Reinach, Switzerland, assignors to J. R. Geigy A.G., Basel, Switzerland
No Drawing. Continuation-in-part of abandoned application Ser. No. 370,711, May 27, 1964. This application Mar. 8, 1967, Ser. No. 621,459
Claims priority, application Switzerland, June 4, 1963, 6,924/63
Int. Cl. C07d 49/18; A01n 9/22
U.S. Cl. 260—310          15 Claims

ABSTRACT OF THE DISCLOSURE

Improved production, in high yield and high degree of purity, of strongly insecticidal 1-N,N-dimethylcarbamoyl-5-methyl-pyrazolyl-(3) N,N-dimethyl-carbamate, of low toxicity to warm-blooded animals, from (a) an alkali metal salt or alkaline earth metal salt of 3-methyl-pyrazol-5-one and (b) N,N-dimethylcarbamoyl chloride, which involves introducing phosgene into the mixture containing the said carbamate and the less insecticidal, highly toxic 3-methyl-5-N,N-dimethylcarbamoyloxy isomer, thereby converting the latter isomer to a novel intermediate salt of the formula

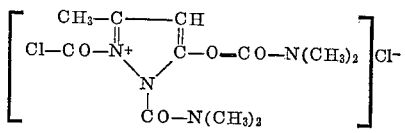

and converting the latter by reaction with dimethylamine to the highly insecticidal carbamate of low toxicity.

CROSS REFERENCE TO RELATED APPLICATION

This application is a continuation-in-part of our pending application Ser. No. 370,711, filed May 27, 1964, now abandoned.

The present invention concerns a new, improved process for the production of pure 1-N,N-dimethylcarbamoyl-5-methyl-3-(dimethyl carbamoyloxy)-pyrazole which is a known substance having excellent insecticidal activity.

This compound is distinguished in particular by its specific insecticidal range of action, particularly by its activity, compared with other insecticides, on resistant types of insects; it is also named 1-N,N-dimethylcarbamoyl-5-methyl-pyrazolyl-(3) N,N-dimethyl-carbamate and has the formula

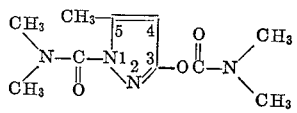

A known method for the production of an insecticidal mixture which is highly toxic to warm-blooded animals and contains this compound, but from which the latter is not isolatable by common industrial methods, consists in reacting 1 mol of 3-methyl-pyrazolone-(5) with up to 2 mols of N,N-dimethyl carbamoyl chloride in the presence of one equivalent of potassium carbonate.

The aforesaid mixture consists essentially of the following three compounds:

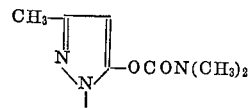

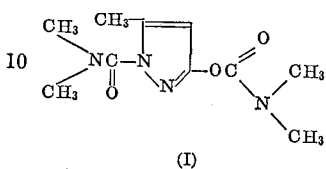 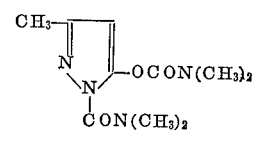

(I)                    (III)

In this mixture, the compound II is much less active as an insecticide than the desired compound I; the compound III is considerably more toxic to warm-blooded animals than compound I. The LD$_{50}$ (rat) is 40 to 45 mg. per kg. bodyweight for compound I; that of compound III is 13 mg. per kg. bodyweight.

Thus, the reaction product obtained by this known process, because of its considerable content of undesirable components, is less insecticidally active than the pure active substance I and it is considerably more toxic to warm blooded animals. The usual industrial separation methods such as distillation permit only a difficult and incomplete removal of the undesirable compounds II and III from the mixture.

It has now been found that a good yield of pure 1-N,N-dimethyl-carbamoyl-5-methyl-3-(N,N-dimethyl carbamoyloxy)-pyrazole is obtained according to the invention by (a) reacting 3-methyl-pyrazolone-(5) or a metal salt thereof with at least one mol and preferably more than two mols, up to about 2.5 mols, of N,N-dimethyl carbamoyl chloride, the reaction being performed if desired, in the presence of an acid binding agent, whereby the aforesaid mixture of compounds (I), (II) and (III), or a mixture consisting preponderantly or exclusively of compounds (I) and (III) is obtained, and (b) then reacting the said mixture first with phosgene and then (c) with dimethylamine, whereby the undesirable compound (III) is unexpectedly converted into the desired compound (I).

Suitable metal salts for use in the above reaction step (a) are particularly those of the alkali metal and alkaline earth metal group.

Inorganic and organic bases, in particular alkali metal and alkaline earth metal carbonates and bicarbonates, as well as pyridine bases, trialkylamines, etc. can be used as acid binding agents in reaction steps (a) and (c), preferred acid binding agents in the former step being potassium carbonate and potassium bicarbonate and in the latter step dimethylamine.

Step (a) is preferably steered so that the formation of compound (II) is largely or completely suppressed. This is achieved by using at least 2 or even more, e.g. up to 2.5 mols of N,N-dimethyl carbamoyl chloride. About 2.2 to 2.4 mols are preferred.

According to one aspect of the invention there is admixed, in step (a), first one mol of dimethyl carbamoyl chloride at a temperature of about 75 to 80° C., and then a further amount of about 1 mol of dimethyl carbamoyl chloride, at about 80 to 85° C.

Step (a) is preferably performed in a liquid aromatic hydrocarbon or halogenated hydrocarbon medium; such medium is preferably anhydrous or practically anhydrous and may consist of benzene, toluene, xylene, chlorobenzene and the like or mixtures of these liquids.

The reaction should be carried out preferably below 100° C. and most preferably at a temperature in the range of 75 to 80° C., e.g. at the reflux temperature of benzene.

The next following reaction step (b) with phosgene is performed at a temperature below 30° C., preferably below 20° C., the upper temperature limit of 30° C. being critical. Above that temperature undesirable by-products are formed.

In reaction step (b) one mol of phosgene reacts with one mol of the compound III to form an intermediate salt of the formula (IV)

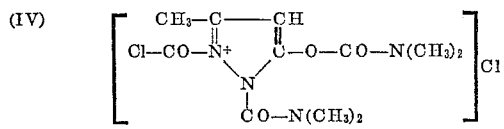

This salt precipitates in crystalline form upon the introduction of phosgene into the benzene solution of the mixture of compounds I and III and can be separated readily therefrom by suction filtration.

However, it is simpler to carry out the next following reaction with dimethylamine directly in the phosgene-treated benzene solution containing the aforesaid salt in suspension.

According to reaction step (c) dimethylamine can be introduced into the reaction mixture resulting from step (b) in gaseous form, or the latter mixture can be added slowly to an excess of dimethylamine in water. It is surprising that the latter method does not lead to a reconversion of compound IV by hydrolysis to compound III.

Unexpectedly, the following reaction takes place:

Compound IV+3 NH(CH₃)₂→
  compound I+Cl—CO—N(CH₃)₂+(CH₃)₂NH·HCl

As a side reaction, dimethyl-carbamoyl chloride reacts with a fourth mol of dimethylamine to form tetramethyl urea. The latter can be easily removed from the final product by distillation in vacuo. At a pressure of 2 to 5 torr, the boiling point of this side product is in the range of 90 to 100° C. The residue consists of the desired compound (I) with a purity of 97%.

Also, in this reaction, the temperature should be held as low as possible, preferably below 30 to 35° C., and, of course, above the freezing point of the organic residue. The preferred temperature range for the steps (b) and (c) is at about 10 to 20° C.

Salts of 3-methyl-pyrazolone-(5) are produced by heating 1 mol of 3-methyl-pyrazolone-(5) with an alkali metal carbonate, e.g. sodium carbonate, or preferably potassium carbonate or an alkaline earth metal hydroxide, e.g. magnesium hydroxide, in an inert solvent. It is important for the formation of the potassium salt that the temperature does not exceed 65 to 75° C. in order to prevent the formation of the red-colored compound of the formula

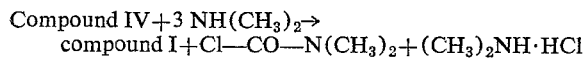

Liquid aromatic hydrocarbons such as, e.g. toluene, xylene, chlorobenzene, and especially benzene, are used as inert solvent for the salt formation and for the following reaction. The resulting potassium salt is then reacted according to step (a) with dimethyl carbamoyl chloride preferably in the presence of an excess of potassium carbonate or in the presence of potassium bicarbonate.

At least two, and preferably three or four mols of dimethylamine are introduced into the reaction mixture per mol of 3-methyl-pyrazol-5-one.

The invention is further illustrated by the following non-limitative examples. Parts and percentages are given therein by weight and the temperatures are in degrees centigrade. 1 torr=1 mm. Hg.

Example 1

980 parts of 3-methylpyrazolone-(5), 1540 parts of potassium carbonate and 5000 parts by volume of benzene are stirred for 1 hour at 70–75° in a 10 liter flask which is fitted with a stirrer, thermometer, dropping funnel, water separator and condenser and then boiled for a short time under slight reflux. The potassium salt of 3-methyl-pyrazolone, which is insoluble in benzene, is formed. When using the starting materials which are practically anhydrous, only traces of water are removed in this step.

1130 parts (1.05 mol) of dimethyl carbamic acid chloride are then added over a period of 4 hours at 75–80°. The reaction mixture is then stirred for 1 hour with gentle refluxing, cooled to 40°, and the precipitated potassium chloride and potassium bicarbonate are separated by filtration from the red colored, clear benzene solution which contains the 3-methyl-pyrazolyl-(5)-dimethyl carbamic acid ester; and washed with benzene to recover any adhering amount of the latter ester. The combined benzene solution is then poured into a 10-liter sulfonating flask which is fitted with a stirrer, thermometer, inlet and outlet tube. 1200 parts of phosgene are introduced into the solution over a period of 2½ hours at 15–20° while cooling well, whereupon the red color changes to yellow-orange and a yellow-orange precipitate forms. The solution is stirred overnight (about 15 hours) at room temperature (20° C.), whereupon the greater part of the precipitate redissolves.

This solution is slowly added during 2–3 hours into 2500 parts of an aqueous 40%-dimethylamine solution, with cooling to 10–20° and stirring. After further stirring for 1 hour and subsequent further standing to separate, the lower phase of aqueous liquid is removed and extracted with 500 parts by volume of benzene. The benzene phases are washed twice with 500 parts by volume of sodium chloride solution each time, separated and dried over calcium chloride. The benzene is then distilled off under reduced pressure at 60°. Tetramethyl urea formed as side product is removed by distillation at 90–100° C./3 torr. The residue consists preponderantly of 1-(N,N-dimethyl - carbamoyl) - 5 - methyl-3-(N,N-dimethyl-carbamoyl-oxy)-pyrazole which crystallizes on cooling. M.P. 66 to 67°. The yield is 75 to 85% of the theoretical, calculated on 3-methyl-pyrazolone.

Example 2

(a) 1500 parts by volume of anhydrous benzene, 460 parts of dry, ground potassium carbonate and 294 parts (3 mol) of 3 - methyl - pyrazolone - (5) are placed in a stainless steel vessel. The mixture is heated for 1 hour at 65° while stirring, and the temperature is then raised to 75°, whereupon 322 parts (3 mol) of dimethyl carbamic acid chloride are gradually added within 4 hours. The temperature of the reaction mixture is kept at 75–77° during this addition. At the end of the reaction, a small amount of water begins to separate and is collected in a separating vessel. Another 322 parts (3 mol) of dimethyl carbamic acid chloride are then added to the reaction mixture during 3 hours at a temperature of 75° while stirring. The mixture is then heated for 8 hours at 82–84° and the water, which is now separating in a greater quantity, is azeotropically distilled off. The mixture is allowed to cool to 60°, 1600 parts of water are added, the whole is stirred for 30 minutes and the mixture is then left to separate into two phases. The aqueous phase which contains mainly potassium chloride is separated.

The benzene phase is heated sufficiently to remove the bulk of the water by azeotropic distillation.

(b) The almost anhydrous benzene solution is then cooled and 200 parts of phosgene are introduced within a period of 7 hours while cooling the solution to about 15 to 20°. The reaction mixture is stirred overnight at 15 to 20°.

(c) To a solution of 200 parts of dimethylamine in 300 parts of water, which is at 20–30°, there is poured, while cooling well, benzene solution containing phosgene, obtained by the preceding step, until the resulting mixture gives a pale pink coloration with phenolphthalein (pH about 8.5). The reaction mixture is then adjusted to a pH of about 11 by the addition of 50 parts of commercial sodium hydroxide, more of the benzene solution containing phosgene is added in the same way and the reaction is again adjusted to pH 11 with aqueous sodium hydroxide solution. These operations are continued until practically no more sodium hydroxide is needed to adjust the pH to 10 to 11. The total amount of sodium hydroxide used amounts to about 180 parts.

The reaction mixture is then allowed to stand in order to separate the phases, the aqueous phase is removed and the benzene solution is distilled. The tetramethyl urea formed as side product is removed by distillation at 93 to 94° under 4 torr. The residue consists of 1-(dimethyl-carbamoyl) - 5 - methyl - 3 - (dimethyl - carbamoyl)-5 - methyl - 3 - (dimethyl - carbamoyloxy) - pyrazole which solidifies on cooling to light colored crystals which melt at 66 to 67°. Calculated on 3-methyl-pyrazolone, the yield is 80 to 90% of the theoretical.

By repeating Example 2, but using a total of 775 parts (about 7.2 mol) of dimethyl carbamoyl chloride, the purity of 1 - (dimethyl - carbamoyl) - 5 - methyl - 3-(N,N - dimethyl - carbamoyloxy) - pyrazole (compound I) is increased to 98%.

Example 3

A suspension of 340 parts (1 mol) of the intermediate salt of Formula IV in 500 parts of benzene is brought to 10° and gaseous dimethylamine (about 70 parts) is introduced thereinto. Excess of dimethylamine precipitates as hydrochloride addition salt, and tetramethyl urea is separated and the desired compound I isolated in the same manner as described in Example 2.

Similar good yields of the desired compound I in high grade purity (above 94%) are obtained when introducing gaseous dimethylamine directly into the reaction obtained by step (b) in Example 2 and otherwise proceeding as described in Example 3.

We claim:

1. In the production of 1 - N,N - dimethylcarbamoyl-5 - methyl - pyrazolyl - (3) N,N - dimethylcarbamate from an alkali metal salt or an alkaline earth metal salt of 3 - methyl - pyrazol - 5 - one and N,N - dimethyl-carbamoyl chloride via a mixture containing the said carbamate and 1 - N,N - dimethylcarbamoyl - 3 - methyl-pyrazolyl - (5) N, N- dimethyl-carbamate, as second carbamate, the improvement of
    (i) introducing phosgene into a solution of said mixture in an inert solvent therefor which is liquid below 30° C., and
    (ii) admixing the resulting phosgenated reaction mixture with at least two molar equivalents of dimethylamine, and an acid binding agent, at a temperature below 35° C., thereby converting said second carbamate to the first-named carbamate, and
    (iii) recovering the latter from the reaction mixture.

2. A process as defined in claim 1, wherein the inert solvent used in step (i) is a liquid aromatic hydrocarbon or halogenated aromatic hydrocarbon.

3. A process as defined in claim 1, wherein the inert solvent used in step (i) is benzene.

4. A process as defined in claim 1, wherein the temperature in step (i) is maintained below 20° C.

5. A process as defined in claim 1, wherein the acid binding agent present in step (ii) is dimethylamine.

6. A process as defined in claim 5, wherein at least 2 mols of dimethylamine are present in step (ii) as acid binding agent.

7. A process as defined in claim 1, wherein in step (ii) said phosgenated reaction mixture is mixed with an aqueous solution of dimethylamine.

8. A process as defined in claim 1, wherein, in step (ii), gaseous dimethylamine is introduced into said phosgenated reaction mixture.

9. A process for the production of 1 - N,N - dimethylcarbamoyl - 5 - methylpyrazolyl - (3) N,N - dimethylcarbamate comprising
    (a) mixing,
        (i) a salt of 3 - methyl - pyrazol - 5 - one - with a metal selected from the group consisting of the alkali metals and the alkaline earth metals, with
        (ii) from at least one up to about 2.5 mols of N,N-dimethylcarbamoyl chloride, per mol of said salt,
    (b) introducing phosgene into the resulting reaction mixture at a temperature below 30° C. and above the freezing point of the mixture, in an inert solvent for the reaction components which is liquid below 30° C.,
    (c) admixing the resulting reaction mixture with at least two molar equivalents of dimethylamine, and an acid binding agent at a temperature of below 35° C., and
    (d) recovering the 1 - N,N - dimethylcarbamoyl - 5-methyl - pyrazolyl - (3) - N,N - dimethylcarbamate from the reaction mixture.

10. A process as defined in claim 9, wherein an alkali metal salt 3 - methyl - pyrazol - 5 - one is used as starting material in step (a).

11. A process as defined in claim 9, wherein the potassium salt of 3 - methyl - pyrazol - 5 - one is used as starting material in step (a).

12. A process as defined in claim 9, wherein the reaction of step (a) is performed in the presence of an acid binding agent.

13. A process as defined in claim 9, wherein the reaction of step (a) is performed in the presence of a member selected from the group consisting of potassium carbonate and potassium bicarbonate, as acid binding agent.

14. A process as defined in claim 9, wherein the temperature of the reaction mixture in step (a) is maintained at about 75 to 85° C.

15. The compound of the formula

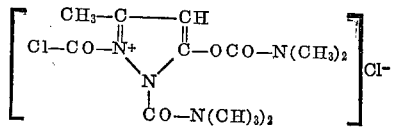

References Cited

UNITED STATES PATENTS 2,681,915   6/1954   Gysin et al.
2,998,426   8/1961   Dickenson et al.

FOREIGN PATENTS 281,956   7/1952   Switzerland.

OTHER REFERENCES

Beilsteins Handbuch der Organischen Chemie, 4th ed., vol. 4, p. 73, Berlin, Julius Springer (1922).

HENRY R. JILES, Primary Examiner.

N. TROUSOF, Assistant Examiner.

U.S. Cl. X.R.

424—273